United States Patent [19]

Nohira et al.

[11] 4,253,432

[45] Mar. 3, 1981

[54] INTAKE SYSTEM OF AN INTERNAL COMBUSTION ENGINE OF A COUNTER-FLOW TYPE

[75] Inventors: Hidetaka Nohira, Mishima; Toshiaki Konomi; Hideaki Matsui, both of Susono, all of Japan

[73] Assignee: Toyota Jidosha Kogyo Kabushiki Kaisha, Toyota, Japan

[21] Appl. No.: 24,514

[22] Filed: Mar. 28, 1979

[30] Foreign Application Priority Data

May 22, 1978 [JP] Japan .................................. 53-59894

[51] Int. Cl.³ ............................................ F02B 15/00
[52] U.S. Cl. ................................................ 123/52 M
[58] Field of Search .............. 123/52 M, 52 MV, 127, 123/75 B

[56] References Cited

U.S. PATENT DOCUMENTS

| | | | |
|---|---|---|---|
| 3,664,316 | 5/1972 | Garcea | 123/52 M X |
| 3,685,503 | 8/1972 | Jackson | 123/75 B X |
| 3,972,324 | 8/1976 | Marsee | 123/52 MV X |
| 3,977,366 | 8/1976 | Yamaguchi et al. | 123/75 B X |
| 4,146,593 | 3/1979 | Higashigawa | 123/127 X |

*Primary Examiner*—Charles E. Phillips
*Attorney, Agent, or Firm*—Kenyon & Kenyon

[57] ABSTRACT

A multi-cylinder engine comprising an intake manifold equipped with a carburetor. A secondary throttle valve is provided for each cylinder. Each of the secondary throttle valves is arranged in the respective manifold branch and fixed onto a common throttle shaft. An auxiliary intake passage is branched off from the collecting portion of the intake manifold and connected to a distribution channel. Each of the intake ports is connected to the distribution channel via a corresponding channel branch which opens into the intake port at a position near the intake valve. The common throttle shaft of the secondary throttle valves is connected to a vacuum operated diaphragm apparatus so that the secondary throttle valves are opened in accordance with a reduction in the level of vacuum produced in the intake manifold.

19 Claims, 5 Drawing Figures

INTAKE SYSTEM OF AN INTERNAL COMBUSTION ENGINE OF A COUNTER-FLOW TYPE

BACKGROUND OF THE INVENTION

The present invention relates to an intake system of a multi-cylinder internal combustion engine.

Particularly in a gasoline engine, in order to obtain a high output power of the engine by increasing the volumetric efficiency when the engine is operating at a high speed under a heavy load, the shape of an intake port is so constructed that the intake port has as small a flow resistance as possible. In the case wherein the intake port has such a shape, since a considerably strong turbulence is spontaneously created in the combustion chamber of the engine when the engine is operating at a high speed under a heavy load, the burning velocity is sufficiently increased. However, when the same engine is operating at a low speed, a satisfactory strong turbulence is not created in the combustion chamber, thus resulting in a problem that a sufficient increase in the burning velocity is not obtained.

As a method of creating a strong turbulence in the combustion chamber when an engine is operating at a low speed, there is a method of compulsorily creating a swirl motion in the combustion chamber by using a helical shaped intake port or by using a shroud valve. However, in the case wherein such a method is adopted, since the flow resistance which the mixture fed into the cylinder is subjected to is increased, there occurs a problem in that the volumetric efficiency is reduced when such an engine is operating at a high speed under a heavy load. Consequently, in order to increase the burning velocity when such an engine is operating at a low speed while ensuring a high volumetric efficiency when the engine is operating at a high speed under a heavy load, it is necessary to form each intake port so that it has as small a flow resistance as possible and, at the same time, to create a strong turbulence in the combustion chamber when the engine is operating at a low speed.

In addition, as a method of improving combustion when an engine is operating at a low speed under a light load, there is a method of promoting the vaporization of fuel, in addition to a method of creating a strong turbulence in the combustion chamber. That is, when an engine is operating at a low speed under a light load, the velocity of air flowing in the venturi of the carburetor is low. Consequently, since the relative speed between the fuel injected from the fuel nozzle and the air flowing in the venturi is small, it is impossible to fully atomize the liquid fuel into fine particles. As a result of this, a large amount of the fuel is fed into the cylinder in liquid form, and thus, there occurs a problem in that good combustion cannot be obtained.

In order to avoid the above-mentioned problems, an engine has been proposed in which the intake passage comprises a main intake passage having a relatively large cross-section, and auxiliary intake passages, each having a relatively small cross-section. Each of the auxiliary intake passages opens into a respective intake port defining a part of the main intake passage. In this engine, the mixture is fed into each combustion chamber from the corresponding auxiliary intake passage via its intake port when the engine is operating under a light load, while the mixture is fed into each combustion chamber from the main intake passage via its intake port when the engine is operating under a heavy load. As mentioned above, in this engine, it is intended that the flow velocity of the mixture be increased for promoting the vaporization of fuel by feeding the mixture into the combustion chamber via the auxiliary intake passage having a relatively small cross-section when the engine is operating under a light load. However, at the time of the intake stroke when the engine is operating under a light load, the amount of the mixture which is actually fed from the auxiliary intake passage into the intake port and then into the combustion chamber is extremely small. This is because, since the intake manifold has a relatively large volume, a part of the mixture located in the intake manifold is also sucked into the combustion chamber via the intake port at the time of the intake stroke. In addition, since the intake port of a given cylinder which is in the intake stroke is in communication with the intake ports of the remaining cylinders, fuel-air mixture is also sucked into the combustion chamber of said given cylinder from the auxiliary intake passages of said remaining cylinders via the intake manifold when said given cylinder is in the intake stroke. As mentioned above, since the mixture located in the intake manifold and the mixture fed into the intake ports of said remaining cylinders from the corresponding auxiliary intake passages is fed into the combustion chamber of said given cylinder which is in the intake stroke, the amount of the mixture fed into the combustion chamber of said given cylinder from its corresponding auxiliary intake passage becomes small. As a result of this, since the mixture cannot flow at a high speed in the auxiliary intake passage which opens into the intake port of said given cylinder, it is impossible to sufficiently promote the vaporization of fuel in the auxiliary intake passage of said given cylinder. In addition, since the intake manifold, that is the part of the main intake passage located downstream of the throttle valve of the carburetor, has a relatively large volume, the amount of fuel adhering onto the inner surface of the intake manifold is large. Consequently, when the level of vacuum in the intake manifold is rapidly increased, as in the case wherein an engine is decelerated, a large amount of the fuel adhering onto the inner surface of the intake manifold is instantaneously vaporized. As a result of this, since an excessively rich mixture is temporarily fed into the cylinder, there occurs a problem in that the amount of unburned HC in the exhaust gas is increased. Finally, in a cross-flow type engine, even if the construction of the intake system becomes complicated, no difficulty arises with regard to the arrangement of the intake system because there is a large space around the intake system. However, in a counter-flow type engine, since there is not a large space around the intake system, there occurs a problem as to how to arrange the intake system when it becomes complicated.

SUMMARY OF THE INVENTION

An object of the present invention is to provide a counter-flow type engine capable of promoting the vaporization of fuel and creating a strong swirl motion in each combustion chamber when an engine is operating under a light load, while ensuring a high volumetric efficiency when an engine is operating at a high speed under a heavy load.

According to the present invention, there is provided a multi-cylinder internal combustion engine having a plurality of cylinders each having a combustion chamber, an intake port, an intake valve and an exhaust port, said engine comprising: an intake manifold comprising a collecting portion having an inlet, and manifold branches branched off from said collecting portion, each of said manifold branches being connected to the respective intake port; a carburetor having a throttle valve and arranged in the inlet of said collecting portion; at least one auxiliary intake passage common to at least two cylinders and having an inlet which opens into said collecting portion and an outlet; at least two auxiliary branch intake passages branched off from the outlet of said auxiliary intake passage, each of said auxiliary branch intake passages having an outlet which opens into a respective one of the intake ports of said two cylinders; and secondary valve means arranged in said manifold branches and opened in accordance with a reduction in the level of vacuum produced in said intake manifold.

The present invention may be more fully understood from the description of preferred embodiments of the invention set forth below, together with the accompanying drawings.

DESCRIPTION OF THE PREFERRED EMBODIMENTS

Figure 1:
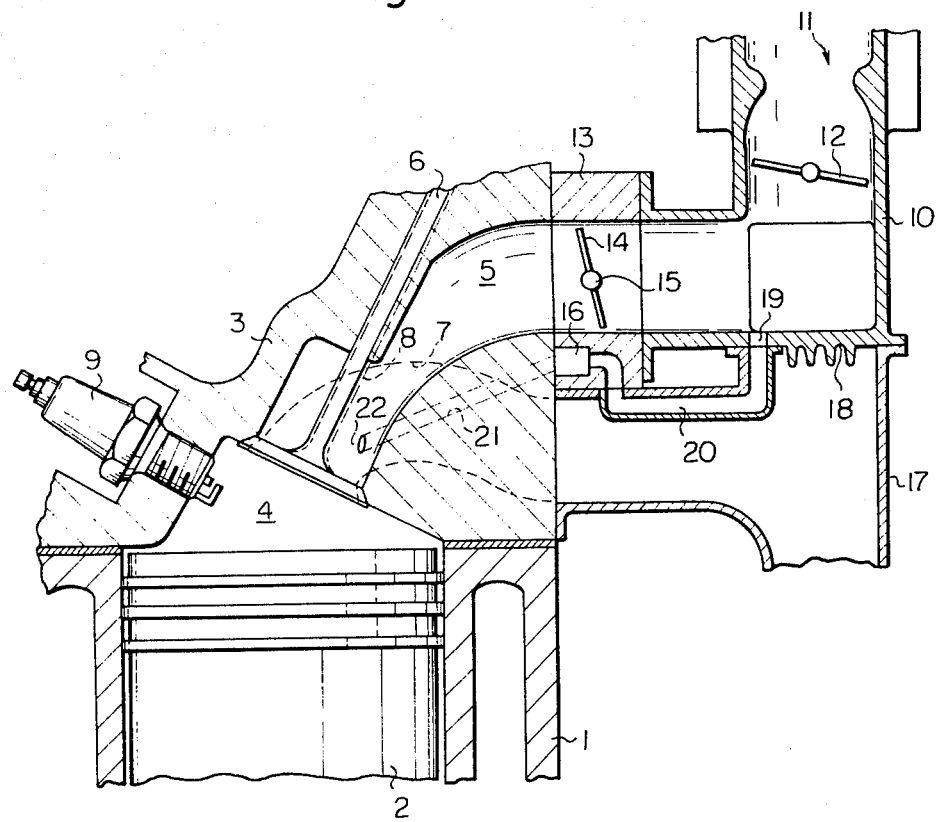
FIG. 1 is a cross-sectional side view of an embodiment of an engine according to the present invention.

Referring to FIG. 1, 1 designates a cylinder block, 2 a piston reciprocally movable in the cylinder block 1, 3 a cylinder head fixed onto the cylinder block 1, and 4 a combustion chamber formed between the top face of the piston 2 and the inner wall of the cylinder head 3; 5 designates an intake port formed in the cylinder head 3, 6 an intake valve, 7 an exhaust port and 8 an exhaust valve; 9 designates a spark plug, 10 an intake manifold, 11 a carburetor and 12 a throttle valve of the carburetor 11. The throttle valve 12 is connected to an accelerator pedal (not shown).

Figure 2:
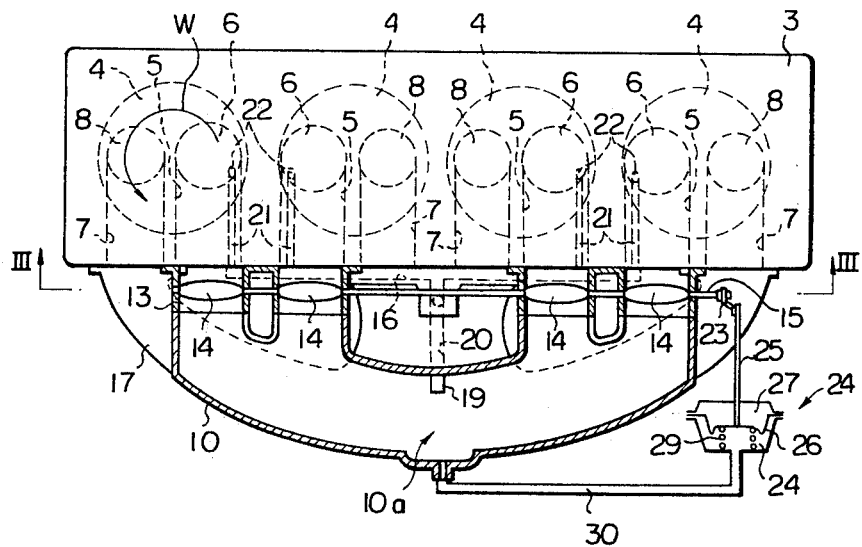
FIG. 2 is a plan view, partly in cross-section, of the engine shown in FIG. 1.

As is illustrated in FIG. 1, the intake manifold 10 is fixed onto the cylinder head 3 via a spacer member 13, and a secondary throttle valve 14 is arranged in the spacer member 13. From FIG. 2, it will be understood that a separate secondary throttle valve 14 is provided for each cylinder and, in addition, that a throttle shaft 15 is common to all of the secondary throttle valves 14. As is illustrated in FIGS. 1 and 2, a distribution channel 16 extending along the longitudinal direction of the engine body is formed in the spacer member 13, and an auxiliary intake passage 20 transversely extending from the center of the distribution channel 16 is also formed in the spacer member 13. This auxiliary intake passage 20 passes through the inside of an exhaust manifold 17 and is connected to an inlet 19 formed on a riser portion 18 of the intake manifold 10 and opening into the collecting portion 10a of the intake manifold 10. On the other hand, four channel branches 21 which are in communication with the distribution channel 16 are formed in the cylinder head 3, and each of the channel branches 21 opens into the respective intake port 5. The opening 22 of each of the channel branches 21 is directed to a valve gap formed between the valve head of the intake valve 6 and a valve seat thereof when the intake valve 6 is opened. In addition, the opening 22 is directed generally tangent to the circumferential direction of the combustion chamber 4. From FIGS. 1 and 2, it will be understood that the distribution channel 16, the auxiliary intake passage 20 and the channel branches 21 have a cross-sectional area which is very much smaller than that of the manifold branches of the intake manifold 10.

As is illustrated in FIG. 2, an arm 23 is fixed onto the end of the throttle shaft 15 of the secondary throttle valves 14, and a control rod 25 of a vacuum operated diaphragm apparatus 24 is pivotally connected to the tip of the arm 23. The diaphragm apparatus 24 comprises an atmospheric pressure chamber 27 and a vacuum chamber 28, which are separated by a diaphragm 26. A compression spring 29 is inserted into the vacuum chamber 28 for always biasing the diaphragm 26 towards the atmospheric pressure chamber 27. The vacuum chamber 28 is connected to the inside of the intake manifold 10, located downstream of the throttle valve 12, (FIG. 1) via a vacuum conduit 30, and the control rod 25 is connected to the diaphragm 26.

Figure 3:
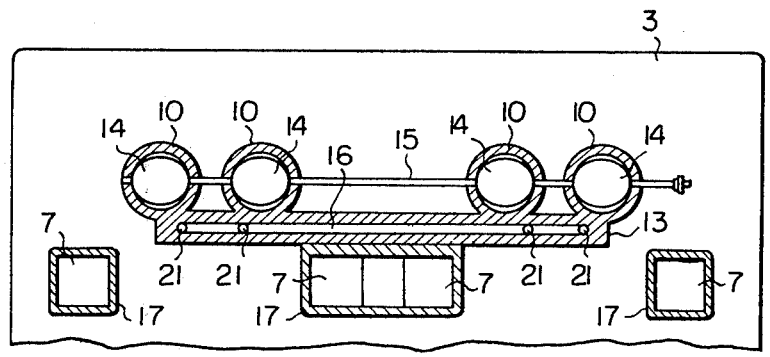
FIG. 3 is a cross-sectional side view taken along the line III—III in FIG. 2.

In the case wherein the openings of the intake and exhaust ports 5, 7, which are formed on the outer side wall of the cylinder head 3, are arranged to be aligned with each other on a straight line and, in addition, the single throttle shaft 15 is used for simultaneously rotating four secondary throttle valves 14, it is necessary to arrange the throttle shaft 15 so that it passes through the inside of the exhaust manifold 17. However, in practice, it is difficult to adopt such an arrangement of the throttle shaft 15. In order to avoid such a difficulty, in the present invention the openings of the intake ports 5 are arranged above the openings of the exhaust ports 7 as illustrated in FIG. 3, and in addition, the openings of the intake ports 5 are spaced from the openings of the exhaust ports 7; so that the distribution channel 16, extending straight, is formed between the openings of the intake ports 5 and the respective openings of the exhaust ports 7. Consequently, in the present invention, the secondary throttle valves 14 are interconnected to each other by means of the single throttle shaft 15 without arranging the throttle shaft 15 so that it passes through the inside of the exhaust manifold.

In operation, when the engine is operating under a light load wherein the opening degree of the throttle valve 12 of the carburetor 11 is small, the level of vacuum produced in the intake manifold 10 is large. As a result of this, since the level of vacuum produced in the vacuum chamber 28 of the diaphragm apparatus 24 becomes large, the diaphragm 26 moves towards the vacuum chamber 28 against the spring force of the compression spring 29. As a result of this, the throttle shaft 15 is rotated, and the secondary throttle valves 14 are positioned at their closed position, as illustrated in FIG. 1. Consequently, at this time, the mixture formed in the carburetor 11 is fed into the combustion chamber 4 of the cylinder which is in the intake stroke via the inlet 19, the auxiliary intake passage 20, the distribution channel 16, the respective channel branch 21 and its intake port 5.

As is illustrated in FIGS. 1 and 2, the auxiliary intake passage 20, the distribution channel 16 and the channel branches 21 have an extremely small cross-sectional area. Consequently, since the mixture flows at a high speed in the auxiliary intake passage 20, the distribution channel 16 and the respective channel branch 21, flow energy is added to the mixture and, as a result, the vaporization of fuel is promoted. In addition, since the mixture is strongly heated by the exhaust gas during the time the mixture flows in the auxiliary intake passage 20, the vaporization of fuel is further promoted. Then, the mixture is spouted from the respective channel branch 21 into its intake port 5 of the cylinder which is in the intake stroke. At this time, since the opening 22 of the channel branch 21 is directed to the valve gap formed between the valve head of the intake valve 6 and the valve seat thereof when the intake valve 6 is opened, and in addition, since the opening 22 is also directed generally tangential to the circumferential direction of the combustion chamber 4, the mixture spouted from the channel branch 21 flows into the combustion chamber 4 at a high speed through the above-mentioned valve gap. Thus, a strong swirl motion, indicated by the arrow W in FIG. 2, is created in the combustion chamber 4 and, as a result, the burning velocity is considerably increased. In addition, in this embodiment, since the distribution channel 16 functions as a balance passage, the distribution of fuel to each cylinder becomes uniform.

When throttle valve 12 of the carburetor 11 is opened to a great extent and, thus, the engine is operating under a heavy load, since the level of vacuum produced in the intake manifold 10 becomes small, the level of vacuum produced in the vacuum chamber 28 also becomes small. As a result of this, the diaphragm 26 moves towards the atmospheric pressure chamber 27 due to the spring force of the compression spring 29, the throttle shaft 15 is rotated, and the secondary throttle valves 14 are fully opened. Consequently, since at this time, the mixture formed in the carburetor 11 is fed into the combustion chamber 4 via the manifold branch of the intake manifold 10, which has an extremely small flow resistance, and via the intake port 5, also having an extremely small flow resistance, a high volumetric efficiency can be ensured.

Figure 4:
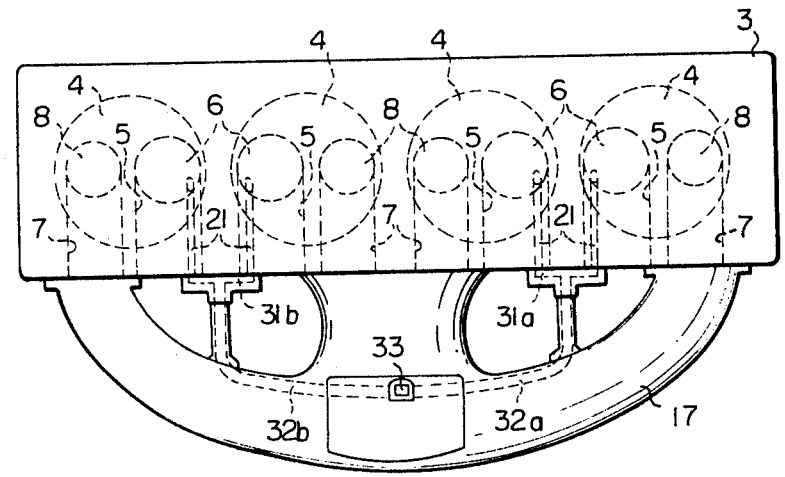
FIG. 4 is a plan view of an alternative embodiment according to the present invention, illustrating the case wherein the intake manifold is removed.
Figure 5:
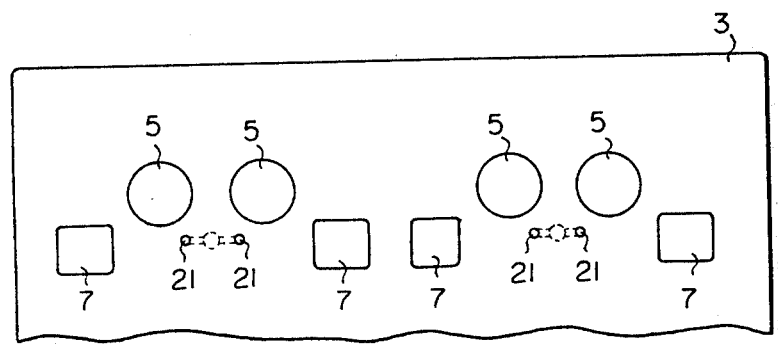
FIG. 5 is a side view of the cylinder head shown in FIG. 4, illustrating the case wherein the intake manifold and the exhaust manifold are removed.

FIGS. 4 and 5 illustrate an alternative embodiment. It should be noted that FIG. 4 illustrates the case wherein the intake manifold is removed. In this embodiment, separate distribution channels 31a and 31b are provided, one for each pair of adjacent cylinders, and each of the distribution channels 31a, 31b is connected to the intake ports 5 of the respective pair of adjacent cylinders via the corresponding channel branches 21. Each of the distribution channels 31a, 31b is connected via a respective auxiliary intake passage 32a, 32b to an inlet 33 which opens into the collecting portion of the intake manifold (not shown). In addition, although the secondary throttle valves are not depicted in FIG. 4, each of the secondary throttle valves is arranged in the respective manifold branch in the same manner as described with reference to FIGS. 1 through 3. As it will be understood from FIG. 5 in this embodiment, it is not necessary to arrange a distribution passage interconnecting all of the channel branches 21 to each other. Consequently, in this embodiment, there is an advantage that the vertical distance between the openings of the intake ports 5 and the openings of the exhaust ports 7 can be reduced as compared with that in the embodiment illustrated in FIGS. 1 through 3.

In either of the above described embodiments, it is preferable that the secondary throttle valves 14 be arranged as near the intake valve 6 as possible. By so arranging the secondary throttle valves 14, the surface area of the intake passage located downstream of the secondary throttle valves 14 is reduced. Consequently, even if the liquid fuel adhering to the inner wall of the intake passage located downstream of the secondary throttle valves 14 is instantaneously vaporized when the throttle valve 12 of the carburetor 11 is abruptly closed, the amount of the fuel instantaneously vaporizing is small and; as a result, it is possible to prevent the mixture fed into the cylinder from becoming excessively rich. In addition, when the engine is operating under a light load, since the intake ports 5 are connected to the intake manifold 10 only via the corresponding channel branch 21, the distribution passage 16 and the auxiliary intake passage 20, each of which has an extremely small cross-sectional area, it is possible to suppress intake interference. In addition, when the engine is operating under a light load, since the mixture is caused to flow at a high speed in the auxiliary intake passage 20, the distribution channel 16 and the channel branch 21, the vaporization of fuel can be promoted and, in addition, it is possible to cause a strong swirl motion in the combustion chamber 4. Furthermore, since the auxiliary intake passage 20 is heated by the exhaust gas, the vaporization of fuel can be even more promoted.

According to the present invention, as mentioned above, since the burning velocity can be increased over the entire range of operating conditions of an engine, stable combustion can be ensured and the amount of harmful components in the exhaust gas can be reduced. Also, fuel consumption can be improved. Finally, since all of the secondary throttle valves are simultaneously opened by means of the single throttle shaft, there are the advantages that the construction of the intake system of an engine becomes compact and that all of the secondary throttle valves can be actuated by means of a single secondary throttle valve drive device.

While the invention has been described by reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders each having a combustion chamber, an intake port, an intake valve, and an exhaust port, said engine comprising:
   an intake manifold comprising a collecting portion having an inlet, and a plurality of manifold branches branched off from said collecting portion, each of said manifold branches being connected to the intake port of a corresponding one of the cylinders;
   a carburetor having a throttle valve and arranged in the inlet of said collecting portion;
   at least one auxiliary intake passage, common to at least two cylinders and having an inlet which opens into said collecting portion and an outlet;
   at least two auxiliary branch intake passages branched off from the outlet of said auxiliary intake passage, each of said auxiliary branch intake passages having an outlet which opens into the intake port of a respective one of said at least two cylinders; and secondary valve means arranged in each of said manifold branches and opened in accordance with a reduction in the level of vacuum in said intake manifold.

2. A multi-cylinder internal combustion engine as claimed in claim 1, wherein each of said auxiliary branch intake passages has a cross-section which is smaller than that of the corresponding manifold branch.

3. A multi-cylinder internal combustion engine as claimed in claim 1, wherein each auxiliary intake passage has a cross-section which is smaller than that of the corresponding manifold branch.

4. A multi-cylinder internal combustion engine as claimed in claim 1, wherein the outlet of each of said auxiliary branch intake passages is in the vicinity of the corresponding intake valve.

5. A multi-cylinder internal combustion engine as claimed in claim 4, wherein the outlet of each of said auxiliary branch intake passages is directed to a gap formed between the corresponding intake valve and a valve seat thereof when the intake valve is opened.

6. A multi-cylinder internal combustion engine as claimed in claim 5, wherein the outlet of each of said auxiliary branch intake passages is directed generally tangent to the circumferential direction of the corresponding combustion chamber.

7. A multi-cylinder internal combustion engine as claimed in claim 1, wherein said engine further comprises a cylinder head having an outer side wall, and forming therein said intake ports and said exhaust ports, a part of each of said auxiliary branch intake passages being located between said intake manifold and the outer side wall of said cylinder head.

8. A multi-cylinder internal combustion engine as claimed in claim 7, wherein the remaining part of each of said auxiliary branch intake passages is formed in said cylinder head.

9. A multi-cylinder internal combustion engine as claimed in claim 7, wherein said engine further comprises a spacer member positioned between said intake manifold and the outer side wall of said cylinder head, said secondary valve means being located in said spacer member.

10. A multi-cylinder internal combustion engine as claimed in claim 9, wherein part of each of the auxiliary branch intake passages is located in said spacer member.

11. A multi-cylinder internal combustion engine as claimed in claim 7, wherein said engine further comprises an exhaust manifold connected to said exhaust ports, and said auxiliary intake passage is located in said exhaust manifold.

12. A multi-cylinder internal combustion engine as claimed in claim 7, wherein said intake ports and said exhaust ports have openings through the outer side wall of said cylinder head.

13. A multi-cylinder internal combustion engine as claimed in claim 12, wherein the upper edges of said openings of said exhaust ports are located below the axes of the openings of said intake ports.

14. A multi-cylinder internal combustion engine as claimed in claim 13, wherein the upper edges of said openings of said exhaust ports are spaced below the lower edges of said openings of said intake ports, and said part of the auxiliary branch intake passages extends straight at a level between the upper edges of said openings of said exhaust ports and the lower edges of said openings of said intake ports.

15. A multi-cylinder internal combustion engine as claimed in claim 1, wherein said secondary valve means comprises a plurality of secondary throttle valves, each being positioned in the manifold branch of a respective cylinder.

16. A multi-cylinder internal combustion engine as claimed in claim 15, wherein each of said secondary throttle valves is located near the intake port of the respective manifold branch.

17. A multi-cylinder internal combustion engine as claimed in claim 15, wherein said secondary throttle valves are fixed onto a common throttle shaft.

18. A multi-cylinder internal combustion engine as claimed in claim 17, wherein said engine further comprises a vacuum operated diaphragm apparatus connected to said common throttle shaft for opening said secondary throttle valves in accordance with a reduction in the level of vaccum produced in said intake manifold.

19. A multi-cylinder internal combustion engine as claimed in claim 18, wherein said diaphragm apparatus comprises a diaphragm connected to said common throttle shaft and a vacuum chamber connected to said intake manifold.

* * * * *

Notice of Adverse Decision in Interference

In Interference No. 101,006, involving Patent No. 4,253,432, H. Nohira, T. Konomi and H. Matsui, INTAKE SYSTEM OF AN INTERNAL COMBUSTION ENGINE OF A COUNTER-FLOW TYPE, final judgment adverse to the patentees, was rendered July 19, 1983, as to claims 1-5 and 15-19.
[*Official Gazette November 15, 1983.*]